United States Patent

Gricchi et al.

[15] 3,644,907

[45] Feb. 22, 1972

[54] COMPLEMENTARY MOSFET MEMORY CELL

[72] Inventors: James R. Gricchi, Catonsville; James R. Hudson, Perryville, both of Md.

[73] Assignee: Westinghouse Electric Corporation, Pittsburgh, Pa.

[22] Filed: Dec. 31, 1969

[21] Appl. No.: 889,603

[52] U.S. Cl. .......... 340/173 FF, 307/279

[51] Int. Cl. .......... G11c 11/40, G11c 7/00, G11c 5/02

[58] Field of Search .......... 340/173 R, 173 FF; 307/279

[56] References Cited

UNITED STATES PATENTS

| | | | |
|---|---|---|---|
| 3,355,721 | 11/1967 | Burns | 340/173 |
| 3,493,786 | 2/1970 | Ahrons et al. | 340/173 X |
| 3,521,242 | 7/1970 | Katz | 340/173 |

*Primary Examiner*—Stanley M. Urynowicz, Jr.
*Attorney*—F. H. Henson and E. P. Klipfel

[57] ABSTRACT

A semiconductor read/write memory array and memory cell therefore including complementary metal oxide semiconductor field-effect transistors (MOSFETs) coupled together as a first and a second inverter circuit with direct cross-coupled connections therebetween for providing a flip-flop circuit. Each bit of the memory array is comprised of at least five MOSFET devices operated from a single clocked power supply source wherein four of the MOSFET devices are operated as complementary pairs to comprise the first and second inverters. The flip-flop circuit is clocked or pulsed for turning the MOSFET devices "off" of one of the inverters referred to as the output inverter to trap an electrical charge at one of the circuit nodes in order to obtain a high input impedance so that the state of the cell can be changed when addressed or alternatively to preset the logic output state of the memory cell. The memory cell is coupled to a common input/output digit data line and an address line of the memory array by means of a selection switch MOSFET so that data is written into and read out of the memory cell on the same digit data line through the selection switch MOSFET when turned "on" by means of a signal applied to the address line. Furthermore, nondestructive readout of the state of the memory cell when addressed is achieved by precharging the digit data line to a predetermined potential prior to the energization of the selection switch MOSFET during the read mode.

13 Claims, 6 Drawing Figures

COMPLEMENTARY MOSFET MEMORY CELL

BACKGROUND OF THE INVENTION

1. Field of the Invention

This invention relates to information storage apparatus and in particular to binary memory elements employing metal oxide semiconductor field-effect transistors and to memory arrays employing such binary memory elements. Further, the binary memory elements are comprised of flip-flops employing complementary field-effect transistors with the entire memory array fabricated as an integrated structure onto a semiconductor substrate.

2. Description of the Prior Art

Integrated circuit bistable memory cells employing metal oxide semiconductor field-effect transistors are well known to those skilled in the art. For example, U.S. Pat. No. 3,447,137 granted to R. Feuer discloses such a memory cell and an array thereof. Furthermore, a binary memory cell utilizing complementary insulated gate field-effect transistors is disclosed in U.S. Pat. No. 3,355,721 granted to J. R. Burns. Also, a publication of the 1965 *International Solid-State Circuits Conference* entitled "The Use of Insulated-Gate Field Effect Transistors in Digital Storage Systems" by J. Wood and R. G. Ball, dated Feb. 19, 1965 at pages 82 and 83, discloses at FIG. 5 a typical memory cell comprised of complementary devices, The memory cell disclosed thereat however employs six field-effect transistors comprising two pairs of complementary transistors connected as cross-coupled inverter circuits through a fifth or feedback field-effect transistor which allows the cell to change its state when the feedback transistor is nonconductive, while the sixth transistor is employed as the selection switch coupling the cell to the digit data line.

While the above recited prior art operates in the manner intended, the present invention is directed to an improved complementary MOSFET memory cell which reduces the number of MOSFET devices heretofore required and which employs a common input/output digit data line coupled to the cell which is selectively charged or discharged during the read mode for providing nondestructive readout of the information previously written into the cell.

SUMMARY

Briefly, the subject invention is directed to complementary metal oxide semiconductor field-effect transistor (MOSFET) memory cell comprising two directly cross-coupled inverter circuits providing a first and a second node at the cross-coupling connections and wherein each of the inverters is comprised of a pair of complementary MOSFET devices coupled between ground and a source of power supply potential. The power supply potential is selectively pulsed or clocked on at least one of the inverters so that when the power supply is reduced, both MOSFETs of that inverter become nonconductive and trap a charge at one of the two nodes so that a high impedance input is provided so that the state of the cell can be changed. Alternatively, the lowering of the power supply potential presets the memory cell to a predetermined binary state. A single selection switch MOSFET couples the memory cell to a common input/output digit data line of a memory array which includes means for selectively altering the charge state of the digit data line prior to readout during a read mode for providing nondestructive readout of the memory cell. The selection switch MOSFET is additionally coupled to and operated from a memory array address line control source by means of an address line whereupon the binary state of the digit data line can be written into the memory cell during the write mode by rendering said selection switch MOSFET conductive as well as reading the binary state of the memory cell out to the digit data line during the read mode.

DESCRIPTION OF THE PREFERRED EMBODIMENTS

Whereas magnetic cores have in the past been significantly less expensive than semiconductor circuits, recent advances in integrated circuit fabrication techniques give promise of significantly reducing the cost of future semiconductor circuits. One recently developed field-effect semiconductor device which can be fabricated using integrated circuit deposition techniques is a surface-type field-effect transistor identified as a metal oxide semiconductor field-effect transistor hereinafter referred to as a MOSFET wherein the potential on a gate terminal controls current between a source terminal and a drain terminal. The gate terminal does not, however, draw current and therefore less steady state power is required than in comparable transistors where a steady state base current must be supplied. The MOS transistor and its operational characteristics are discussed in detail in the publication "IEEE Transactions on Electronic Devices," July 1964, at pages 324–345.

As mentioned above, the MOS transistor includes a gate or control terminal, a first current conducting or source terminal and a second current conducting or drain terminal. The MOS transistor is a bilateral device and as a matter of fact is usually substantially symmetrical so that the source and drain terminals are effectively interchangeable. Additionally, when the source and drain terminals are connected across a source of power supply potential, a voltage of at least 4 volts must be applied between the gate and source terminals in order to render the device conductive, i.e., turn it "on," so that current flows between the source and drain terminals. This is referred to as the threshold voltage of the device.

Figures 1, 2:
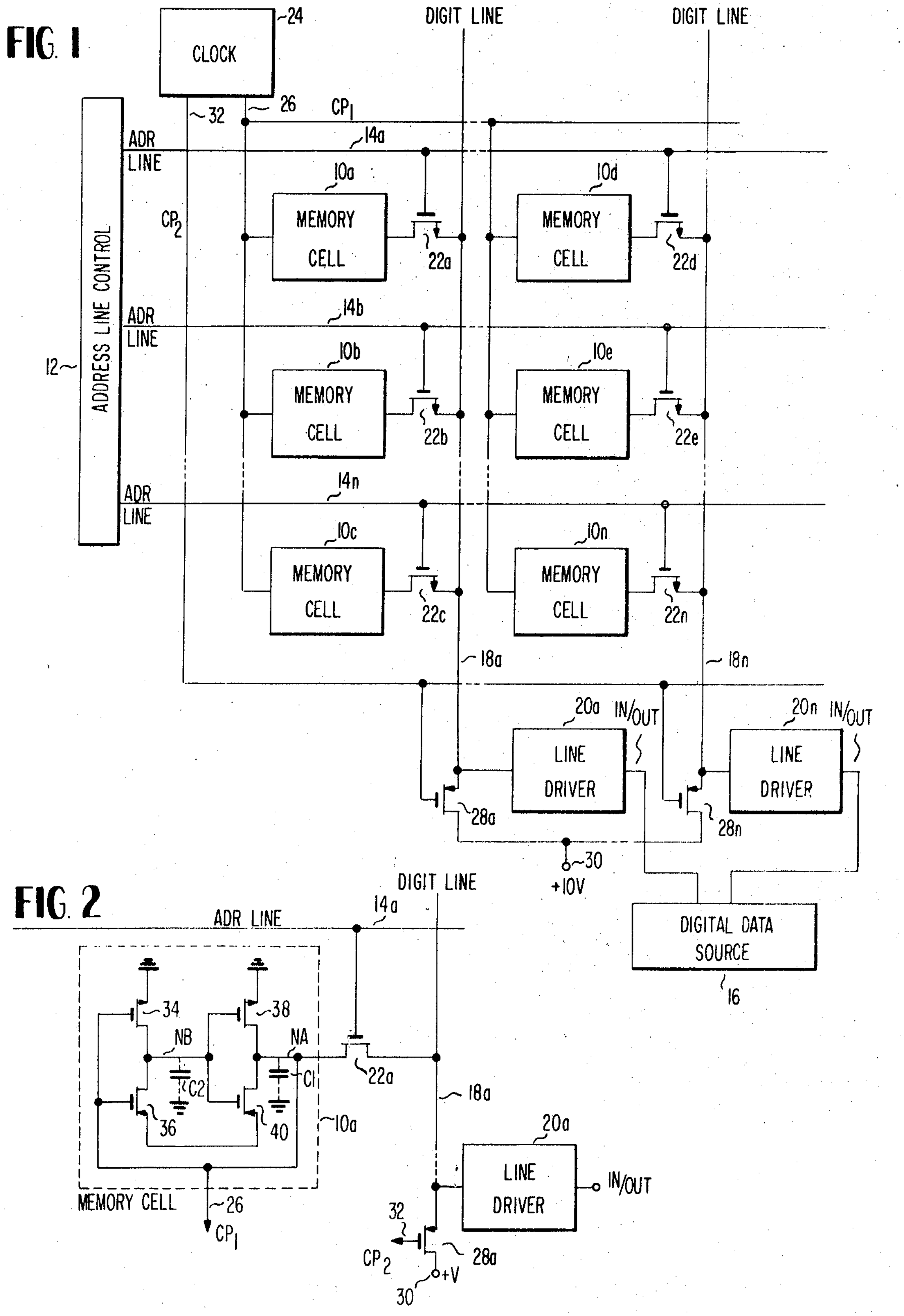
FIG. 1 is a partial electrical block diagram illustrative of a simplified memory array utilizing the concepts embodying the subject invention.
FIG. 2 is an electrical schematic diagram illustrative of the first embodiment of a memory cell comprising the subject invention and utilized in the memory array shown in FIG. 1.

Referring now to the drawings and more particularly to FIG. 1 wherein like numerals refer to like parts, there is disclosed a memory array comprised of a plurality of binary digital memory cells 10*a* . . . *10n* coupled to an address line control means 12 through address lines 14*a*, 14*b* . . . 14*n* and to a digital data source 16 by means of common input/output digit data transfer means referred to as digit data lines 18*a* . . . 18*n* coupled to respective line driver circuits 20*a* . . . 20*n*. Each of the memory cells 10*a* . . . 10*n* is coupled to its respective digit data line 18*a* . . . 18*n* by means of selection switch MOSFETs 22*a* . . . 22*n* by means of the drain and source terminals while the gate terminal is coupled to a respective address line 14*a* 14*n*. Each of the memory cells 10*a* . . . 10*n* is supplied a clock signal CP1 from the clock source 24 which appears on circuit line 26. CP1 comprises a supply voltage for the memory cell. In addition to being coupled to the digital data source 16, each of the digital data lines 18*a* . . . 18*n* is adapted to have its charge state selectively changed during the read mode, prior to addressing a memory cell which will be explained hereinafter, by means of respective MOSFETs 28*a* . . . 28*n*. This is accomplished by having the source and drain terminals coupled between the respective digit data line 18*a* . . . 18*n* and a fixed power supply potential, for example +10 volts, applied to the terminal 30. The gate terminal of the digit data line MOSFETs 28*a* . . . 28*n* has a second clock signal CP2 applied to it from the clock 24 by means of the signal line 32.

Briefly in operation, each of the memory cells 10*a* . . . 10*n* in the array shown in FIG. 1 is adapted to be selectively addressed or nonaddressed by means of a signal appearing on the respective address line 14a . . . 14n and is adapted to receive and store information appearing on the respective digit data line 18a . . . 18n during a write mode in accordance with the operation slaved to the clocked supply potential CP1 as well as reading out the stored information during a read mode onto the respective digit data line 18a . . . 18n. Each of the memory cells 10a . . . 10n is addressed by rendering its associated selection switch MOSFET 22a . . . 22n conductive by means of an energizing voltage applied to its gate from the respective address line 14a . . . 14n. Additionally, each of the digit data lines 18a . . . 18n is "precharged" in the subject embodiment to a potential of positive polarity (+6 volts) through the MOSFET 28a . . . 28n prior to the selection switch MOSFET 22 being rendered conductive for providing a nondestructive readout of the binary information state of the addressed memory cell.

Referring now to FIG. 2, there is disclosed a schematic diagram of a first embodiment of the subject invention and which comprises the memory cell 10a shown in FIG. 1. The memory cell 10a is comprised of a flip-flop circuit including a first pair of MOSFETs 34 and 36 cross coupled to a second pair of MOSFETs 38 and 40. The cross coupling comprises a direct connection between the drain terminals of MOSFET 38 and 40 to the gate terminals of MOSFET 34 and 36, providing a first circuit node NA thereat and between the drain terminals of MOSFET 34 and 36 to the gate terminal of MOSFET 38 and 40, providing a second circuit node NB. It is well known to those skilled in the art that a MOSFET device includes inherent capacitance associated with its circuit terminals. Accordingly, each of the circuit nodes NA and NB comprises the combined circuit capacitance of the respective MOSFETS which is identified as $C_1$ and $C_2$. The MOSFETs 34 and 38 are shown comprised of N-channel devices with their respective source terminals coupled to a point of common reference potential illustrated as ground. On the other hand, the MOSFETs 36 and 40 are shown comprising P-channel devices with their source terminals commonly connected to the clocked supply potential CP1 of FIG. 1.

Each pair of the complementary MOSFETs 34 and 36, and 38 and 40 operate as an inverter circuit wherein one of the MOSFETs is "off" i.e., nonconducting, while the other MOSFET of the pair is "on" and vice versa. For example, if +10 volts is applied as a steady state supply potential to the memory cell 10a, the cross coupling provided at nodes NA and NB will be at zero volts. This means that MOSFET 34 is "on" or conducting while MOSFET 36 is "off" or nonconducting, while MOSFET 38 is "off" and MOSFET 40 is "on." Additionally, if the voltage at NA is at ground or zero potential the binary digital logic state of the memory cell is defined as being a logical "0." On the other hand, if the voltage at the node NA is positive and for example +10 volts, the state of the memory cell is defined as being in a logical "1" state. Node NA may therefore be referred to as the input/output node. It will be observed, however, that one of the MOSFETs in each of the two inverters is in an "on" condition and as such provides a low impedance at the nodes NA and NB.

In prior art apparatus such as disclosed in the publication of the 1965 *International Solid State Circuits Conference* referenced above, the memory cell includes a feedback MOSFET coupled between the pair of inverter circuits for allowing the state of the memory cell to be changed. It is difficult to change the state of a cross-coupled flip-flop unless you do certain things or operate on the circuit in a certain manner. Normally, it means generating a high input impedance state during the write mode. This was accomplished in the prior art apparatus by means of the feedback MOSFET. In the embodiment of the subject invention shown in FIG. 2 the state of the memory cell is rendered changeable by the clocked supply potential CP1 wherein the value of the supply potential is reduced during the write mode prior to the address of the cell 10a through its associated selection switch MOSFET 22a.

Assume for the sake of example that the potential at node NA at the beginning of the write mode is at the logical "1" level or +10 volts which is the amplitude of the supply potential CP1 fed from the clock 24 over the clock pulse circuit line 26. If the node NA is at +10 volts, the voltage at node NB is at zero volts. The node capacitance $C_1$ is also charged to the +10-volt level and a logic "1" is said to be stored in the memory cell 10. Refer now additionally to the waveforms shown in FIG. 3(*a*) wherein a logical "1" is stored and it is desired to write a logical "0" into the memory cell 10. The clocked supply potential CP1 is reduced to ground potential effectively removing the supply potential from the MOSFETs 36 and 40. MOSFET 40 is necessarily in a conductive or "on" state. When the supply potential CP1 is reduced to zero, the charge on the node capacitance $C_1$ discharges through MOSFET 40 down to its threshold voltage (≈4 volts) whereupon it becomes nonconductive. Since MOSFET 38 was previously "off," both MOSFET 38 and 40 are now "off" and a charge is trapped at node NA corresponding to the voltage originally present +10 volts minus the threshold voltage of +4 volts or approximately +6 volts. Since node NB is at zero volts, MOSFET 36 was in an "off" condition and remains "off." MOSFET 34, on the other hand, which was initially "on" now turns "off." This condition wherein all of the MOSFETs 36 through 40 are in an "off" condition with the charge trapped at node NA allows the state of the memory cell now to be changed when addressed. In the example where a logical "0" is to be written and stored in the memory cell 10, the digit data line 18a will be at a voltage level of zero volts. Upon the occurrence of a positive signal appearing on the address line 14a (waveform ADR), the selection switch MOSFET 22a is turned "on" whereupon the node capacitance $C_1$ at the node NA discharges to ground potential. Node NA presently represents a logic "0" state of the memory cell and the supply potential CP1 is again raised to a positive potential (+10 volts) whereupon MOSFET 36 turns "on" charging the node capacitance $C_2$ of the node NB to +10 volts and MOSFET 40 remains in an "off" state.

Figure 3:
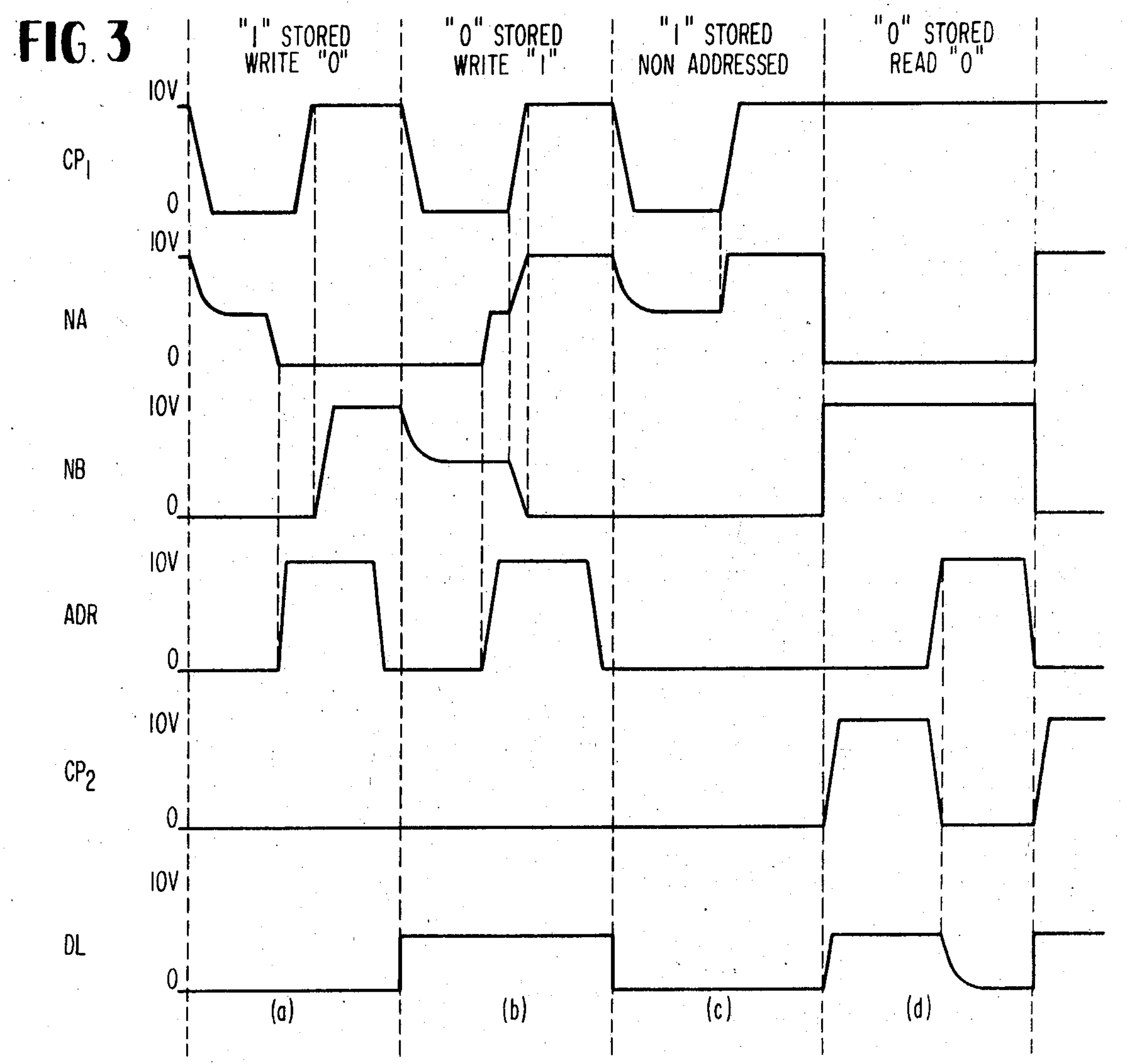
FIGS. 3(*a*) – 3(*d*) comprise a diagram of time-related voltage waveforms of signals appearing at selected circuit points of the embodiment shown in FIG. 2.

In the event that a logical "1" is desired to be written into the memory cell 10a where a logical "0" was previously stored i.e., NA is at zero volts, the reduction of the clocked supply potential CP1 turns "off" previously conducting MOSFETs 36 and 38 whereupon a charge is trapped at node NB as shown by the waveform NB of FIG. 3(*b*). When the selection switch MOSFET 22a is turned "on" from the address line 14a, the voltage present on the digit data line 18a as shown by waveform DL will charge the node capacitance $C_1$ to the voltage appearing on the digit data line. If the magnitude of the voltage applied to the line driver 20a is +10 volts, a +6 volts will appear on the digit data line 18a during the time a logical "1" is to be written into the cell since 4 volts will be dropped across MOSFET 28a. This means that the node capacitance $C_1$ will charge to a +6-volt level such as shown in FIG. 3(*b*) for the waveform of NA. Upon the subsequent rise of the clock supply potential CP1, MOSFET 40 again becomes conductive as well as MOSFET 34, whereupon the charge trapped on the node capacitor $C_2$ is discharged through MOSFET 34 and the voltage at node NA will rise to +10 volts.

In a nonaddressed mode for example where the logical "1" is stored in the memory cell 10 and the node NA is at a +10-volt level, the waveforms of FIG. 3(*c*) illustrate that upon the reduction of the pulsed supply potential CP1, the charge on the node capacitance $C_1$ will reduce until the threshold voltage of MOSFET 40 is reached whereupon it turns "off." When MOSFET 40 turns "off," a charge is trapped at node NA and remains at that level until the supply potential again rises to +10 volts at which time MOSFET 40 again turns "on" and the voltage at NA returns to +10 volts. This signifies that the binary state of the memory call 10a is not affected by the reduction of the clocked supply potential CP1 when the cell is not addressed. What has been considered up to this point is the write mode and the nonaddressed storage mode of the memory cell 10a shown in FIG. 2.

Consider now the read mode whereupon the logic state of the memory cell 10*a* as represented by the voltage level at node NA is translated to the digit data line 18*a* or a static situation occurs when the memory cell 10*a* is addressed by means of turning the selection switch MOSFET 22*a* "on" by means of a voltage applied to the address line 14*a*. Attention is additionally directed to the MOSFET 28*a* coupled by means of its source and drain terminals to the digit line 18*a* and the supply terminal 30 to which is applied a +10-volt fixed supply potential. The purpose of the MOSFET 28*a* is to "precharge" the data line 18*a* to a positive potential prior to the addressing of the memory cell 10*a* in the read mode. This is accomplished by supplying a clock signal CP2 from the clock 24 shown in FIG. 1 and as illustrated in FIG. 3(*d*) to the gate terminal of MOSFET 28*a* whereupon it turns "on" and a voltage (+10 volts minus the 4-volt threshold voltage of MOSFET, i.e., +6 volts) is applied to the digit data line 18*a*. Inasmuch as a capacitance is inherently present on the digit data line 18*a*, it will hold the +6-volt level as shown by the waveform DL in FIG. 3(*d*) in connection with the waveform CP2. Assuming that the data line 18*a* is precharged to +6 volts and that the state of the memory cell is at logic "0," the supply potential CP1 is maintained at a constant value of +10 volts during the read mode. This dictates that MOSFET 38 is in an "on" state. The application of an address signal as shown by waveform ADR in FIG. 3(*d*) turns MOSFET 22*a* "on" whereupon the +6 volts appearing on the digit data line 18*a* discharges to ground through MOSFET 22*a* and 38.

If the state of the memory cell 10 is already a logic "1" and the voltage at node NA is at a voltage level of +10 volts, the precharging of digit line 18*a* to +6 volts and the energization of selection switch MOSFET 22*a* causes a substantially static condition to exist due to the fact that the threshold voltage of the selection switch MOSFET 22*a* is approximately +4 volts and the voltage at node NA is +10 volts. A +6-volt level would therefore appear at the source of MOSFET 22*a* which is at the same voltage as the voltage level of the digit data line 18*a*. When the selection switch MOSFET 22*a* is turned "off" at the end of the read mode, the voltage level at node NA has not changed in either case so that a nondestructive readout of the state of the memory cell 10 is achieved.

In respect to the embodiment of the memory cell 10*a* shown in FIG. 2, the type of semiconductivity material of which the selection switch MOSFET 22*a* and the digit data line precharging MOSFET 28*a* is comprised, that is, whether an N-channel or P-channel device, is dictated by the semiconductivity type of the MOSFETs 36 and 40 in the memory cell and which are clocked by CP1. In the embodiment shown in FIG. 2, the MOSFETs 36 and 40 are shown to be P-channel devices. Thus in order to provide the proper drive capability between the digit data line 18*a* in the memory cell 10*a*, the selection switch MOSFET 22*a* must be an N-channel device, and vice versa. Since an N-channel transistor, e.g., MOSFET 22*a* cannot provide a positive voltage drive efficiently, the precharging of the digit data line to the logic "1," i.e., +6-volts is resorted to. Secondly, by precharging the digit data line 18*a* by means of a P-channel MOSFET 28*a*, sufficient drive capability is provided. This accounts for the relative semiconductivity of the MOSFET devices 22*a* and 28*a* shown in FIG. 2. On the other hand, if MOSFETs 36 and 40 are chosen to be N-channel devices, the selection switch MOSFET 22*a* would be chosen to be a P-channel device.

Figure 4:
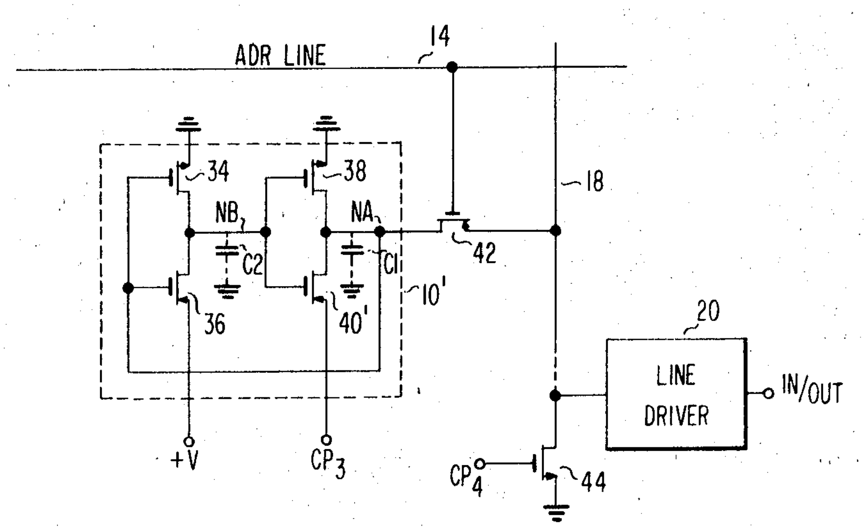
FIG. 4 is an electrical schematic diagram of a second embodiment of a memory cell contemplated by the subject invention.

The second embodiment of a complementary MOS memory cell which is adapted to be utilized in a memory array such as shown in FIG. 1, is the embodiment shown in FIG. 4 and comprises a memory cell 10' which is adapted to be "preset" prior to the write mode by a modification of the clock signals generated by the source 24 whereupon the digit data line is predischarged or "precharged to a zero volt level" prior to the read mode. The memory cell 10' is in all respects identical with the memory cell 10*a* shown in FIG. 2 with the exception that the MOSFET 40' is designed to be a very high resistance device in comparison to the selection switch MOSFET 42 by adjustment of the width-to-length ratio of the size of the MOSFET 40' on its respective substrate, not shown. Whereas the memory cell 10*a* shown in FIG. 2 is powered by a clocked or pulsed supply CP1 applied to both inverter circuits by means of MOSFETs 36 and 40 respectively, the embodiment of FIG. 4 is coupled to a clocked +10-volt supply voltage CP3 similar to CP1 as shown in FIG. 5(*a*) and which is coupled singly to the inverter circuit including MOSFET 40' while a fixed +V (+10 volt)-supply voltage is applied to the inverter circuit including MOSFET 36.

Figure 5:
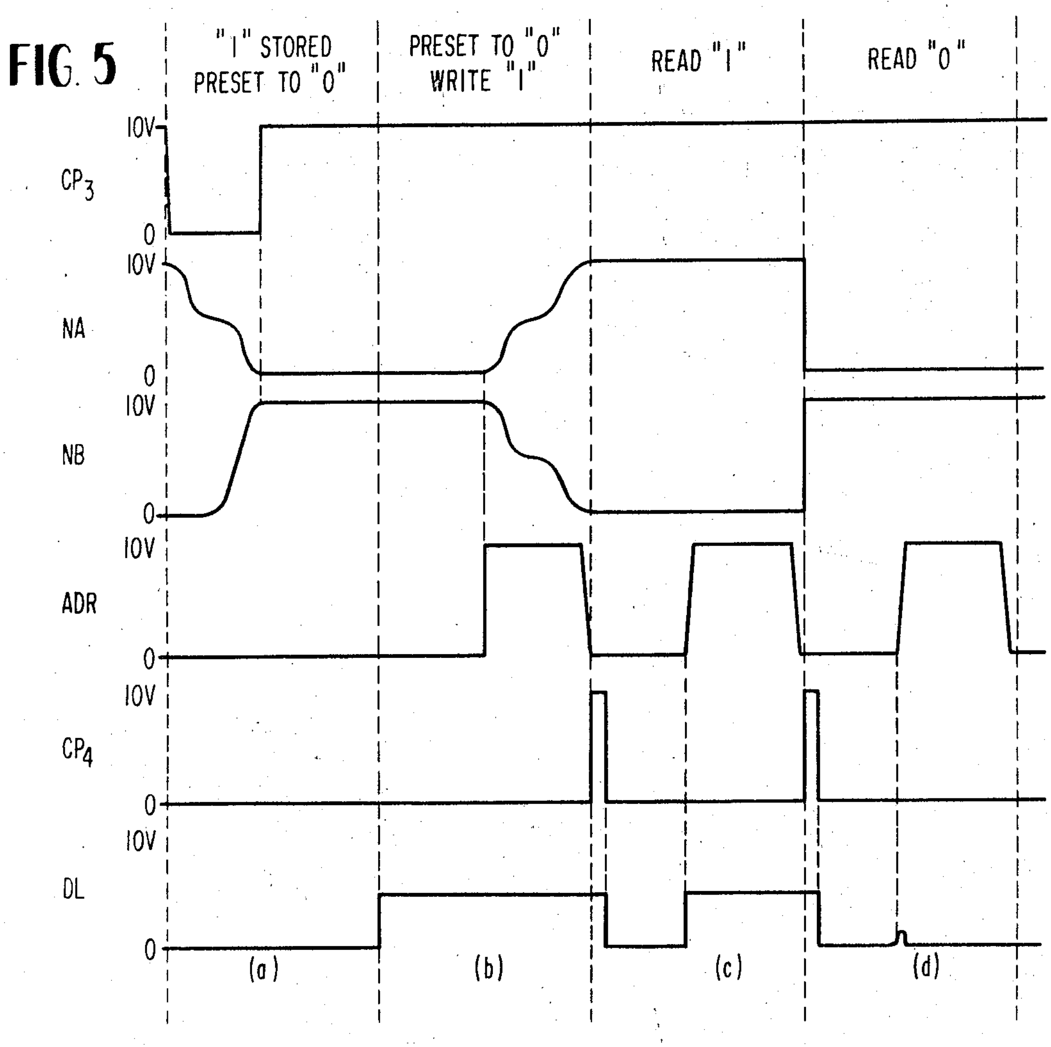
FIGS. 5(*a*) –5(*d*) comprise a diagram of time-related voltage waveforms appearing at selected points of the circuit shown in FIG. 4.

The operation of the memory cell 10' can be understood by referring to the waveforms in FIGS. 5(*a*)–5(*d*). Assuming that the state of the memory cell 10' is a logic "1" wherein the voltage at node NA is +10 volts, the clock supply voltage CP3 is reduced to ground potential. Meanwhile, the selection switch MOSFET 42 is maintained in an "off" condition. As with the embodiment shown in FIG. 2, the charge accumulated on the node capacitance $C_1$ discharges through MOSFET 40' until it turns "off." Meanwhile, the node voltage NA applied to the gate terminals of MOSFETs 34 and 36, causes MOSFET 36 to begin conducting, at which time the voltage at node NB rises to +10 volts. This voltage in turn pulls the voltage at node NA to ground through the MOSFET 40' and the logic "0" level is set in the cell at node NA. This is shown by the waveforms illustrated in FIG. 5(*a*).

If a logic "0" is present on the digit data line 18 during the write mode when the memory cell 10' is addressed by means of a positive signal applied to the gate terminal of the selection switch MOSFET 42, the node NA and the digit data line 18 will be at the same ground potential and no change occurs.

Assuming however that the line driver 20 has applied a logic "1" corresponding to +6-volts on the digit data line 18 and the cell has been preset to "0," the clock supply potential CP3 meanwhile has again risen to and remains at +10 volts as shown by FIG. 5(*b*). Addressing the cell 10' by turning "on" selection switch MOSFET 42 as shown by waveform ADR of FIG. 5(*b*) causes a current flow from the digit data line 18 through the MOSFET 42 which charges the node capacitance $C_1$ (waveform NA) at which time the voltage at node NA will rise and at the same time switch the conductive states of the MOSFETs 34 and 36 of the first inverter circuit such that the voltage at node NB goes to zero by the discharge of the node capacitance $C_2$ due to the turning "on" of the MOSFET 34. Thus a logic "1" is written into the memory cell 10'.

The read mode of the memory cell 10' shown in FIG. 4 is opposite to that shown in FIG. 2 due to the fact that the digit data line 18 is predischarged prior to the address of the memory cell 10' by the selection switch MOSFET 42. This discharge of the digit data line 18 is accomplished by means of the MOSFET 44 having its source terminal connected to ground and which is turned "on" by means of a clock signal CP4 from the clock 24 of FIG. 1. Thus in the read mode when the memory cell 10' is in a logic "1" state such as shown by the waveforms of FIG. 5(*c*) the date line 18 will be charged through the MOSFET 42 which is a P-channel device and which is capable of driving the data line from the node NA. On the other hand, when the memory cell 10' is in a logic "0" state, the voltage at the node NA is zero and since the digit data line 18 is at zero volts, little or no current transfer takes place and very little drive current is required from the high resistance MOSFET 40'. This is illustrated by the waveforms of FIG. 5(*d*).

It should also be noted that since the digit data line 18 is not precharged to a +6-volt level in the read mode as previously taught by the embodiment shown in FIG. 2, the present discharge of the digit data line 18 to zero volts for the embodiment shown in FIG. 4 can be accomplished by means of an N-channel MOSFET 44 without detrimental effects.

Figure 6:
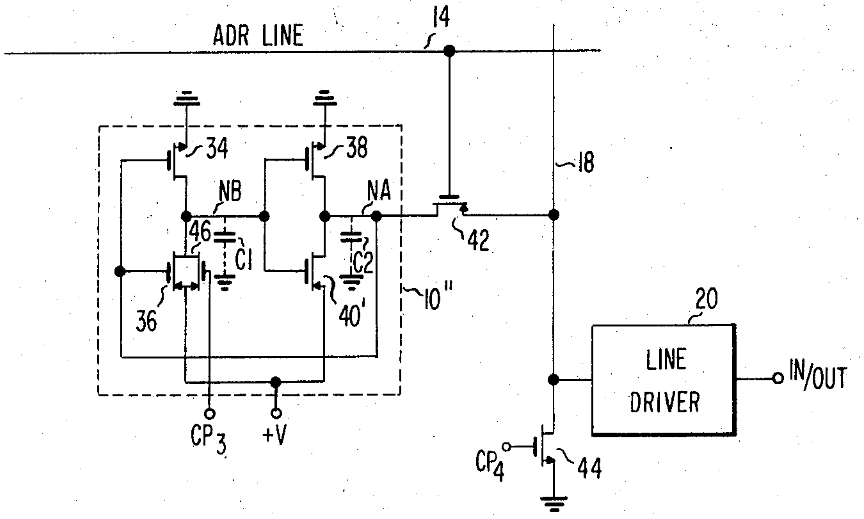
FIG. 6 is an electrical schematic diagram of a third embodiment of a memory cell contemplated by the subject invention.

Finally, a third embodiment of a memory cell 10'' contemplated by the subject invention is shown schematically in FIG. 6 and is in all respects identical to the embodiment shown in FIG. 4 with the exception that a fifth MOSFET 46, which is complementary to MOSFET 36 is coupled back-to-back thereto by means of its drain and source electrodes. In this embodiment, a fixed +V (+10 volts)-supply potential is applied to the source electrodes of MOSFETs 36, 46, and 40'. The clock pulse signal CP3 however is applied now to the gate of the MOSFET 46, which acts to preset the memory cell 10'' to a logic "0" state prior to the write mode as in the case for the embodiment shown in FIG. 4. In this embodiment, the clocked pulse signal CP3 turns the MOSFET 46 "on" bringing the voltage at node NB to +10 volts while driving the node NA to ground potential through MOSFET 38. The waveforms shown in FIG. 5(*a*)–5(*d*) also apply to this embodiment.

What has been shown and described, therefore, is an improved complementary MOS memory cell which is operated and clocked to both trap a charge at one of the circuit nodes of the memory cell and/or presetting the memory cell to a predetermined logic level prior to the write cycle as well as selectively altering the charge state of the digit data line prior to the read mode for providing a nondestructive readout of the memory cell.

It should be observed that the present detailed description of the embodiments disclosed herein is made by way of illustration only and is not meant to be considered in a limiting sense.

We claim as our invention:

1. The combination comprising:

a binary memory cell operable in a read and write mode and comprised of a first and a second binary logic inverter circuit each having an input and an output terminal; first circuit means directly connecting the output terminal of said first inverter circuit to the input terminal of said second inverter circuit and defining a first circuit node thereat; second circuit means directly connecting the input terminal of said first inverter circuit to the output terminal of said second inverter circuit and defining a second circuit node thereat, said first and said second circuit nodes additionally including a first and a second node capacitance respectively which is adapted to be charged or discharged in accordance with the binary logic state of said first and second inverter;

clock circuit means providing at least a first and a second synchronized clock voltage signal;

means coupling said clock circuit means to at least one inverter circuit of said first and said second inverter circuits for applying said first clock voltage signal thereto for altering the conductive state of one inverter circuit during a first portion of the write mode to selectively constrain the voltage at said first circuit node to a predetermined voltage level;

memory cell-addressing means having a signal applied thereto indicative of a nonaddress and an address command during said read and write mode of operation;

common input/output data-transfer means having a signal applied thereto indicative of a first and a second binary logic level during said read and write mode of operation;

memory cell-selection switch means, connected to and operated by said addressing means, coupled between said common input/output data-transfer means and said first circuit node of said memory cell, being energized by said addressing means to connect said first circuit node to said input/output data means; and means coupled to said clock circuit means and said common input/output data-transfer means and responsive to said second clock voltage signal from said clock circuit means for selectively establishing a predetermined charge state on said input/output data-transfer means during a first portion of the read mode of operation prior to the energization of said selection switch means.

2. The invention as defined by claim 1 wherein said first and second binary logic inverter circuit is each comprised of a pair of complementary field-effect semiconductor devices having an input terminal and a pair of output terminals and including circuit means commonly connecting the input terminals of each pair together and one like output terminal of each of said pair of output terminals together.

3. The invention as defined by claim 2 wherein said field-effect semiconductor devices are comprised of metal oxide semiconductor field-effect transistors wherein said input terminal comprises the gate terminal and said pair of output terminals comprises the source and drain terminals.

4. The invention as defined by claim 1 including means coupling said clock means to both inverter circuits of said first and second inverters as a power supply voltage, and circuit means returning both inverters to a point of reference potential, said first clock voltage signal changing to a level during said first portion of the write mode prior to the energization of said addressing means to selectively trap a charge on one node capacitance of said first and second node capacitance to render said first and second inverter nonconductive and thereby providing a relatively high impedance at said first circuit node so that the logic state of said memory cell can be easily changed during said write mode when said addressing means is energized.

5. The invention as defined by claim 4 wherein said first and second inverter circuits are comprised of a first and second pair of complementary field-effect transistors each having gate, source, and drain terminals; circuit means commonly coupling said gate terminals of each pair together and the drain terminal of each pair together and wherein said clock voltage signal is commonly applied to like source terminals of both pairs of field-effect transistors; and circuit means coupling the opposite like source terminals of said first and second pairs to said point of reference potential.

6. The invention as defined by claim 5 and wherein said selection switch means comprises another field-effect transistor having gate, source, and drain terminals and additionally including means coupling the source and drain terminals between said first circuit node and said common input/output data-transfer means, and said gate terminal to said memory cell-addressing means.

7. The invention as defined by claim 6 and wherein said means for selectively establishing a predetermined charge state on said input/output data-transfer means comprises still another field-effect transistor having gate, source, and drain terminals including circuit means for coupling said second clock voltage signal from said clock circuit means to said gate terminal, and circuit means coupling said source and drain terminals between a predetermined voltage and said common input/output data-transfer means.

8. The invention as defined by claim 7 wherein said another and said still another field-effect transistor comprise field-effect transistors of mutually opposite type semiconductivity.

9. The invention as defined by claim 8 wherein said still another field-effect transistor comprises a P-channel device and wherein said drain terminal is coupled to a positive voltage supply and said source terminal is coupled to said common input/output data-transfer means whereby said input/output data-transfer means is precharged to a positive potential prior to the energization of said another field-effect transistor during said read mode of operation.

10. The invention as defined by claim 9 wherein all field-effect transistors comprise metal oxide semiconductor field-effect transistors.

11. The invention as defined by claim 1 wherein said first and second binary inverter circuits are each comprised of a pair of complementary field-effect transistors having base, source and drain terminals, and including means mutually coupling said gate terminals of each pair together and said drain terminals of each pair together and wherein said first clock voltage signal of said clock circuit means is applied to one of said source terminals of one pair of complementary field-effect transistors and including circuit means coupling a point of reference potential to the other source terminal of said one pair of field-effect transistors; and a constant supply potential connected to one source terminal of the other pair of field-effect transistors including circuit means coupling the other source terminal of said other pair of field-effect transistors to said point of reference potential.

12. The invention as defined by claim 11 and wherein said means for establishing a predetermined charge state on said input/output data-transfer means comprises a field-effect transistor having a gate, source and drain terminals including circuit means coupling said second clock voltage signal from said clock circuit means to said gate terminal and circuit means coupling said drain and source terminals between said point of reference potential and said input/output data-transfer means, being rendered conductive by said second clock voltage signal to establish a substantially zero-charge state on said input/output data-transfer means prior to the energization of said selection switch means during said read mode.

13. The invention as defined by claim 1 wherein said first and second binary inverter circuits are each comprised of a pair of complementary field-effect transistors having gate, source and drain terminals including circuit means for coupling said gate terminals of each pair of transistors together and said drain terminals of each pair of transistors together; circuit means coupling one like source terminal of each of said pair of transistors to a point of reference potential;

a source of fixed power supply potential commonly coupled to the other like source terminal of each of said pair of transistors; another field-effect transistor having gate, source, and drain terminals including circuit means for connecting the drain and source terminals thereof commonly to the respective source and drain terminals of the transistor of said complementary pair of transistors of said second inverter stage having like semiconductivity; and circuit means coupling said first clock voltage signal of said clock circuit means to the gate terminal of said another transistor for selectively presetting the binary logic state of said first circuit node to a predetermined digital logic level.

* * * * *